United States Patent
Cleron et al.

(10) Patent No.: US 7,308,480 B2
(45) Date of Patent: *Dec. 11, 2007

(54) BROWSER-BASED EMAIL SYSTEM WITH USER INTERFACE FOR AUDIO/VIDEO CAPTURE

(75) Inventors: Michael A. Cleron, Menlo Park, CA (US); Lennart Lovstrand, Palo Alto, CA (US); Jeffrey D Yaksick, Sunnyvale, CA (US); Sean M. Callahan, St Paul, MN (US); Mark N. Krueger, Fukuoka (JP)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/207,506

(22) Filed: Aug. 19, 2005

(65) Prior Publication Data

US 2006/0010222 A1    Jan. 12, 2006

Related U.S. Application Data (63) Continuation of application No. 10/222,281, filed on Aug. 15, 2002, now Pat. No. 6,963,903, which is a continuation of application No. 09/768,896, filed on Jan. 23, 2001, now Pat. No. 6,460,075, and a continuation of application No. 09/126,614, filed on Jul. 31, 1998, now Pat. No. 6,223,213.

(51) Int. Cl.
*G06F 15/16* (2006.01)

(52) U.S. Cl. .................... 709/206; 709/203; 709/219; 709/231; 715/752

(58) Field of Classification Search ................ 709/203, 709/206–207, 219, 231, 217, 245; 715/752
See application file for complete search history.

(56) References Cited

U.S. PATENT DOCUMENTS

| 5,557,320 | A |   | 9/1996  | Krebs              |         |
|-----------|---|---|---------|--------------------|---------|
| 5,781,901 | A |   | 7/1998  | Kuzma              |         |
| 5,903,723 | A | * | 5/1999  | Beck et al.        | 709/200 |
| 5,937,160 | A |   | 8/1999  | Davis et al.       |         |
| 5,974,449 | A |   | 10/1999 | Chang et al.       |         |
| 6,014,688 | A |   | 1/2000  | Venkatraman et al. |         |
| 6,014,689 | A | * | 1/2000  | Budge et al.       | 709/206 |

(Continued)

FOREIGN PATENT DOCUMENTS

WO    WO9727534    7/1997

OTHER PUBLICATIONS

Foo, S., et al., "System Architectural Design for Delivering Video Mail Over the World-Wide-Web", Divison of Software Systems, Nanyang Technological University, Computer Science & Technology, 1997, vol. 12, pp. 372-385.

(Continued)

*Primary Examiner*—Oanh Duong (57) ABSTRACT

A browser-based email system implemented in a computing device is connected to a host mail server. The host mail server provides pages which can be rendered by a browser to present an email service to a user. The browser-based email system receives audio data, video data, and/or still images, and supports a user interface to facilitate capture of the audio data, video data, and/or still images for inclusion in an email message.

3 Claims, 10 Drawing Sheets

U.S. PATENT DOCUMENTS

| | | |
|---|---|---|
| 6,075,844 A | 6/2000 | Goldberg et al. |
| 6,175,857 B1 * | 1/2001 | Hachiya et al. ............. 709/206 |
| 6,185,551 B1 * | 2/2001 | Birrell et al. .................. 707/3 |
| 6,212,535 B1 * | 4/2001 | Weikart et al. ............. 715/513 |
| 6,212,551 B1 | 4/2001 | Asghar et al. |
| 6,250,930 B1 | 6/2001 | Mintz |
| 6,252,588 B1 | 6/2001 | Dawson |
| 6,255,588 B1 | 7/2001 | Shepherd |
| 6,332,164 B1 * | 12/2001 | Jain ........................... 709/235 |
| 6,466,968 B2 * | 10/2002 | Shirai et al. ................ 709/206 |
| 6,549,612 B2 | 4/2003 | Gifford et al. |
| 6,704,394 B1 * | 3/2004 | Kambhatla et al. ......... 379/67.1 |
| 6,707,891 B1 | 3/2004 | Guedalia |
| 6,765,996 B2 | 7/2004 | Baxter, Jr. |
| 6,775,359 B1 | 8/2004 | Ron et al. |
| 6,859,213 B1 * | 2/2005 | Carter ........................ 715/752 |
| 2002/0112005 A1 * | 8/2002 | Namias ....................... 709/206 |

OTHER PUBLICATIONS

Handley, M. et al., "The World-Wide-Web: How Servers Work", THe Interoperability Report, Connexions, 1995, pp. 12-24.

* cited by examiner

BROWSER-BASED EMAIL SYSTEM WITH USER INTERFACE FOR AUDIO/VIDEO CAPTURE

RELATED APPLICATIONS

This application is a continuation of and claims priority to U.S. patent application Ser. No. 10/222,281 entitled "Browser-Based Email System with User Interface for Audio/Video Capture" filed Aug. 15, 2002 now U.S. Pat. No. 6,963,903 to Cleron et al., the disclosure of which is incorporated by reference herein.

U.S. patent application Ser. No. 10/222,281 is a continuation of and claims priority to U.S. patent application Ser. No. 09/768,896 filed Jan. 23, 2001 to Cleron et al. which is now U.S. Pat. No. 6,460,075 issued on Oct. 1, 2002, the disclosure of which is incorporated by reference herein.

U.S. patent application Ser. No. 09/768,896 is a continuation of and claims priority to U.S. patent application Ser. No. 09/126,614 filed Jul. 31, 1998 to Cleron et al. which is now U.S. Pat. No. 6,223,213 issued on Apr. 24, 2001, the disclosure of which is incorporated by reference herein.

BACKGROUND

Email systems facilitate the exchange of electronic mail over a network, such as a LAN (local area network), WAN (wide area network), or public network (e.g., Internet). Most people are familiar with traditional computer email systems, which are constructed on a client-server model. The email system involves a server-based mail program residing on the server computer to manage the exchange of email messages over one or more networks and a client-based mail program residing on the client to implement a mailbox that receives and holds the email messages for a user. The client-based mail program also implements a graphical user interface that enables the user to open and read mail, or to create new mail messages.

To support the client-based mail program, the traditional computer email systems assume that the clients are full functioning general-purpose computers with their own operating system, processing resources, memory resources, and so forth. Examples of such clients include workstations, desktop computers, laptops, and the like.

With the advent of alternative client products having limited processing capabilities and memory, more server centric email systems have evolved that rely on the Internet and the World Wide Web (Web) as the delivery vehicle. These scaled down or "thin" clients are typically constructed with just enough functionality to enable access to the server computer over a network. The thin client commonly implements a browser, but does not have the ability to execute other application programs, such as traditional client-based mail programs.

Examples of thin clients include low cost computers known as "network computers" or "NCs" and television set-top boxes (STBs). NCs and STBs provide limited local processing, but are primarily reliant on the server for most processing.

Browser-based email systems are well suited for thin clients. The client mailbox is maintained at a server and the client accesses the mailbox using standard Web protocol, such as HTTP (hypertext transport protocol). The server serves images of the mailbox and opened mail messages as standard pages written in a markup language, such as HTML (hypertext markup language). The client browser renders the pages so that the user perceives a full functioning email system.

SUMMARY

This invention concerns a browser-based email system having a thin client connected to a host mail server. The thin client implements a browser. The host mail server provides pages to the thin client, which can be rendered by the browser to present an email service to a user. One page contains a mail message screen that allows a user to construct an email message.

According to one aspect of the invention, the email system allows the thin client to capture audio and video data for inclusion with the email message. The thin client is equipped with a microphone and video input to receive audio and video data. The client browser supports a user interface that includes pop-up capture panels for both audio and video, with each capture panel enabling the user to record a selected clip and add the clip to the email message. The captured data clip is stored locally at the client.

After a data stream is captured, the browser submits a request to the host mail server that contains a token in lieu of the data clip. The host mail server returns a response specifying a new page that contains the email message. The response also includes the token and indicates a location in the new page at which the audio or video data is to be rendered. Upon receiving the response, the browser inserts the audio or video data into the new page at the location and renders the new page.

After the user has reviewed the email message, the user can click a "Send" link on the rendered email page to send the email message to an intended recipient. Upon activation of the "Send" link, the browser submits another request to the host mail server that contains both the email message and the audio or video data. Upon receiving this second request, the host mail server converts the email message and the audio or video data to a MIME message (Multipurpose Internet Mail Extensions) and forwards the MIME message to the intended recipient, where it can be rendered in full.

BRIEF DESCRIPTION OF THE DRAWINGS

The same numbers are used throughout the drawings to reference like features and components.

DETAILED DESCRIPTION

This invention concerns a browser-based email system and method for capturing audio and video clips within an email message. The invention is described generally in the context of thin clients, and more specifically in a preferred context of a browser-based set-top box (STB). In particular, aspects of this invention may be implemented in a system that integrates Web access and television so that users can access Web content on the Internet through a standard television set. The system includes a set-top box having a television tuner and standard network interface devices to enable simultaneously viewing of both television programs and web programming. One example of this system is the "WebTV®" Internet system, maintained by WebTV Networks, Inc. of Palo Alto, Calif. It is noted, however, that aspects of this invention may be implemented in contexts other than television and set-top boxes.

System Overview

Figure 1:
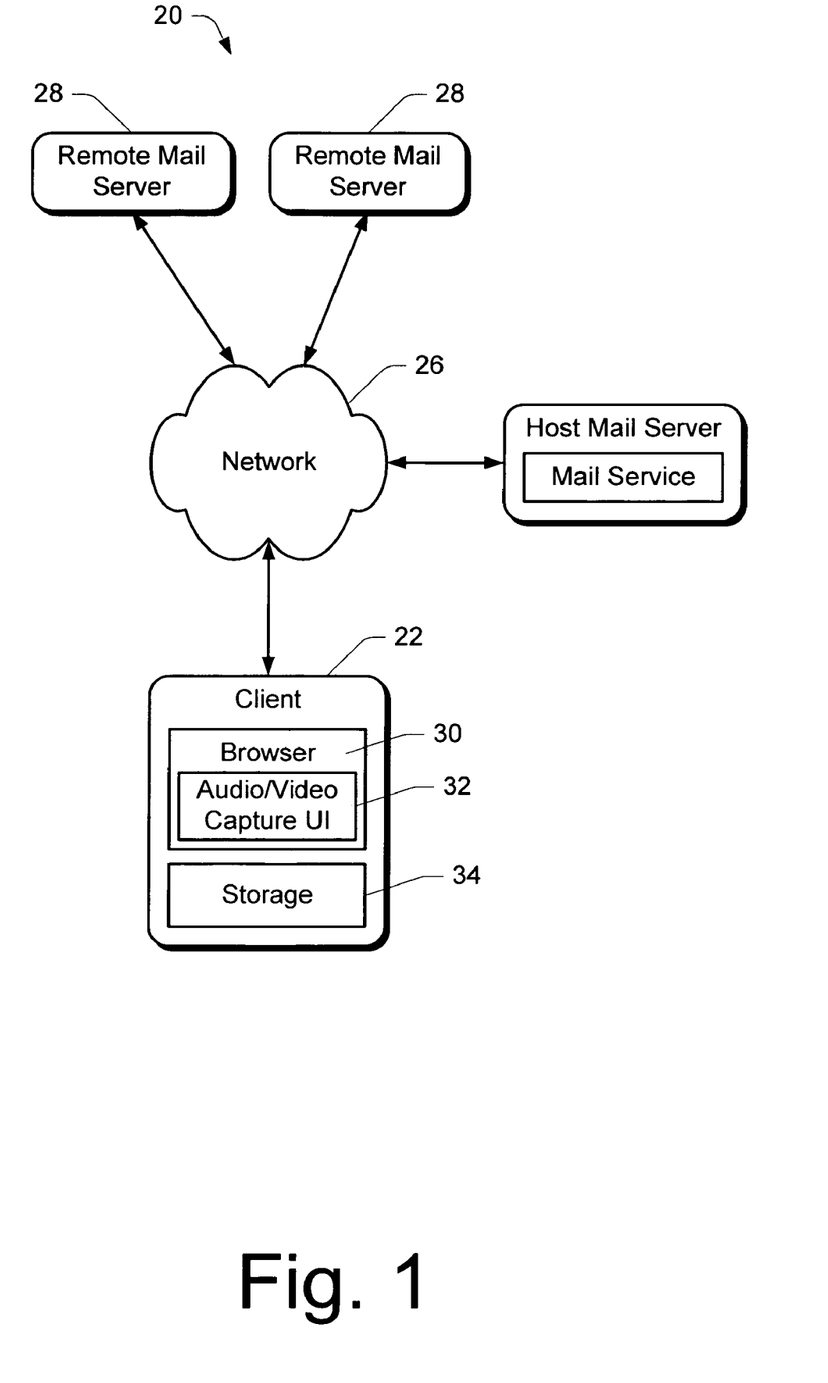
FIG. 1 illustrates a browser-based email system.

FIG. 1 shows a browser-based email system 20 having a client 22 connected to a host mail server 24 via a network 26. Other remote mail servers 28 are also coupled to the network. The system is representative of an Internet system in which the client and servers are interconnected via the Internet 26. The client 22 and servers 26 and 28 connect to the Internet 26 via conventional means, such as a direct-dial telephone, ISDN (Integrated Services Digital Network), or other similar connection.

Although not shown, the client 22 and servers 24 and 28 may use an intermediary Internet Service Provider (ISP) to facilitate connection to the Internet 26. In other configurations, the client 22 may connect directly to the host mail server 24 via a second network, such as a cable or telephone network.

The client 22 is preferably a thin client having enough processing and storage capabilities to support a Web browser. As one exemplary implementation, the client 22 includes a set-top box in conjunction with a television set to deliver both television and Web programming. This exemplary implementation is described below in more detail with reference to FIG. 2. Other implementations of a thin client (e.g., network computer) may alternatively be implemented within the context of the email system.

The client 22 implements a hyperlink browser 30 to browse the Web and to use the email system. The Web browser 30 presents a user interface (UI) 32 that includes a screen space to display rendered pages written in a markup language, such as HTML. The UI 32 provides separate windows or exposable panels that enable a user to capture audio, video, and other types of data clips for inclusion in a mail message. The client also has a storage 34 to store the data clips.

The host mail server 24 implements a mail service 36 to facilitate the exchange of email messages with the remote mail servers 28 over the network 26. The mail service 36 has a mailbox for the client 22 that receives and holds email messages addressed to the client. The mail service 36 extends email functionality to the client 22 by creating pages that appear, when rendered by the client browser 30, as an interface to an email program. For instance, when the user first enters the email service, the initial page might contain a listing of email messages arranged chronologically according to their delivery date.

If the user wishes to open one of the mail messages, the user clicks a button or hyperlink that causes the client to send a request to the mail service 36 at the host mail server 24. In response, the mail service 36 opens the requested mail message, constructs a new HTML page containing the contents of the mail message, and downloads the HTML page to the client 22. The user can then undertake other email functions, such as replying to a message or creating a new message, with each action resulting in the mail service 36 creating and downloading an HTML page with an appropriate image. Thus, to the user, the client appears to be running a local email program.

Exemplary Client

Figure 2:
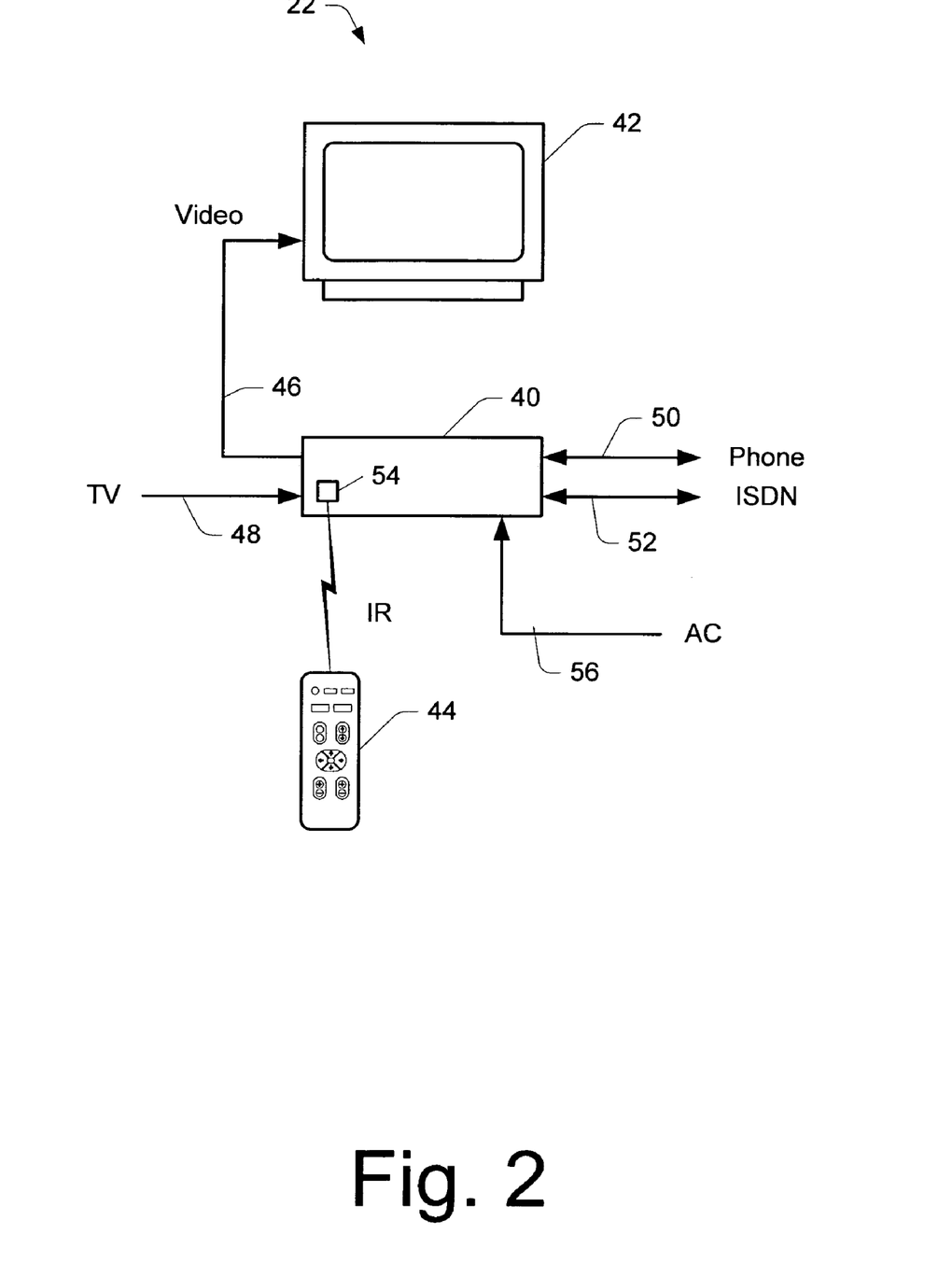
FIG. 2 illustrates a client in the email system.

FIG. 2 shows the client 22 according to one exemplary implementation. It includes a set-top box 40, an ordinary television set 42, and a remote control 44. The client 22 uses the television set 42 as a display device for displaying video data and the browser UI. The set-top box 40 is coupled to the television set 42 by a video link 46, such as RF (radio frequency), S-video, composite video, or other equivalent form of video link. Although the client shows the STB implemented separately from the television set, the STB functionality may alternatively be integrated into the television set.

The set-top box 40 includes hardware and/or software for receiving and decoding a TV signal 48, such as an NTSC, Phase Alternate Lines (PAL), Sequential Couleur Avec Memoire (SECAM), High Definition Television (HDTV), or other TV signal, and providing video data to the television set via video link 46. The STB 40 includes a standard modem and an ISDN modem to support a telephone connection 50 or an ISDN connection 52. The set-top box 40 has an IR interface 54 to receive IR signals from the remote control 44. Power line 56 provides power to the STB 40.

Figure 3:
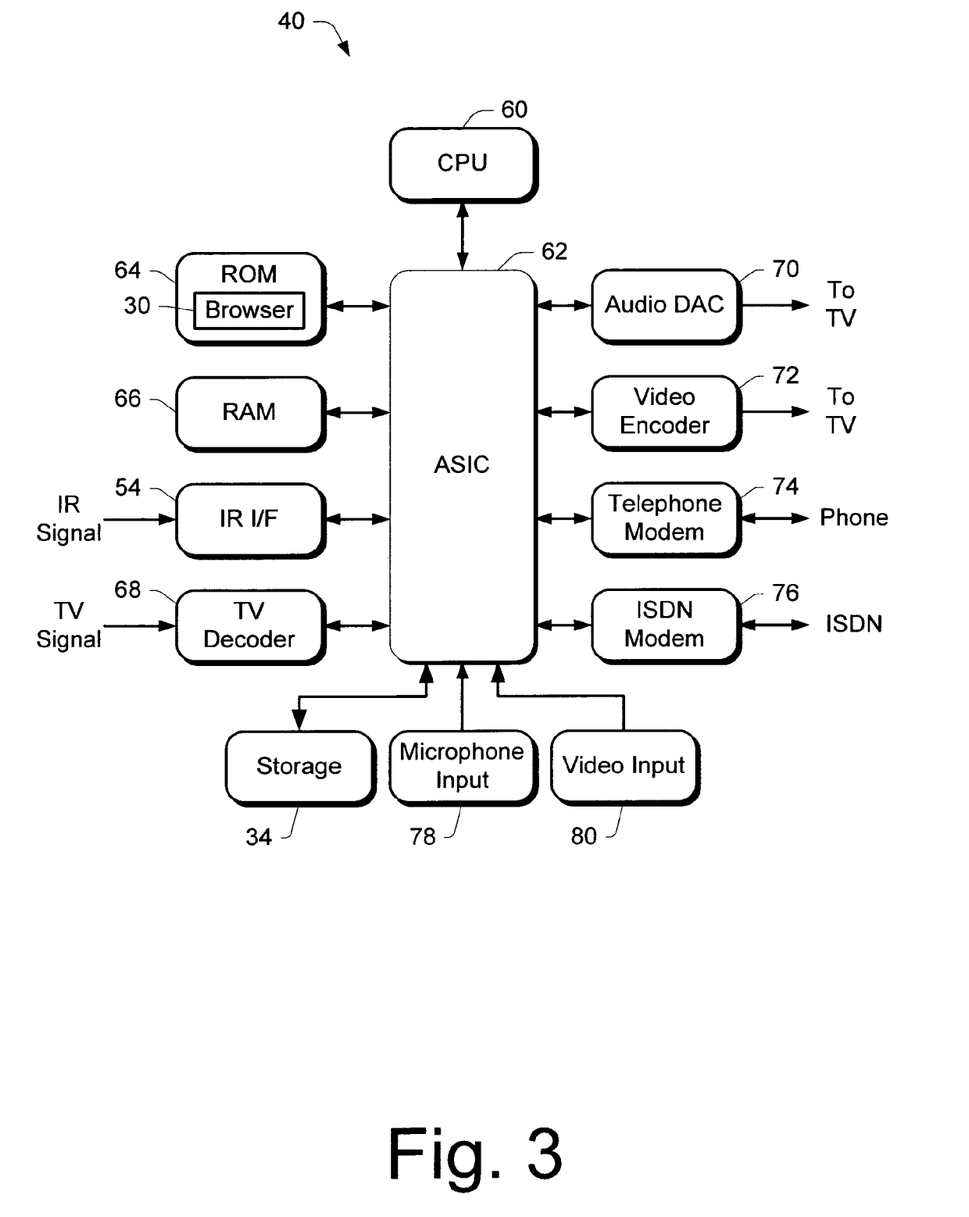
FIG. 3 is a block diagram of a set-top box employed in the client.

FIG. 3 shows the internal components of the set-top box 40. It has a central processing unit (CPU) 60 coupled to an application-specific integrated circuit (ASIC) 62. The CPU 60 executes software designed to implement features of the present invention and to control operation of the client. ASIC 62 contains circuitry to implement certain features provided by the client and forms a communications chip that interfaces other STB components.

ASIC 62 is coupled to a Read Only Memory (ROM) 64 and a Random Access Memory (RAM) 66. ROM 64 stores program code for implementing the browser software to be executed by the set-top box 40. ROM 64 may be a programmable ROM (PROM) or any form of erasable PROM (EPROM) or Flash memory.

The IR interface 54 detects IR signals transmitted by remote control 44 and converts them to electrical signals input to the ASIC 62. A television decoder 68 decodes television signals received from a television source, such as cable, satellite, or antenna. ASIC 62 is coupled to an audio digital-to-analog converter (DAC) 70 and a video encoder 72, which provide audio and video output to the television. ASIC 62 is further coupled to a standard telephone modem 74 and an ISDN modem 76.

The STB 40 is also equipped with a microphone input 78 to receive audio input and a video input 80 to receive video input from, for example, a video camera. The storage 34 is coupled to ASIC 62 to store the audio/video clips captured at the client. The storage 34 includes any suitable medium for storing electronic data, such as magnetic disks, optical disks, and the like.

Browser Software

Figure 4:
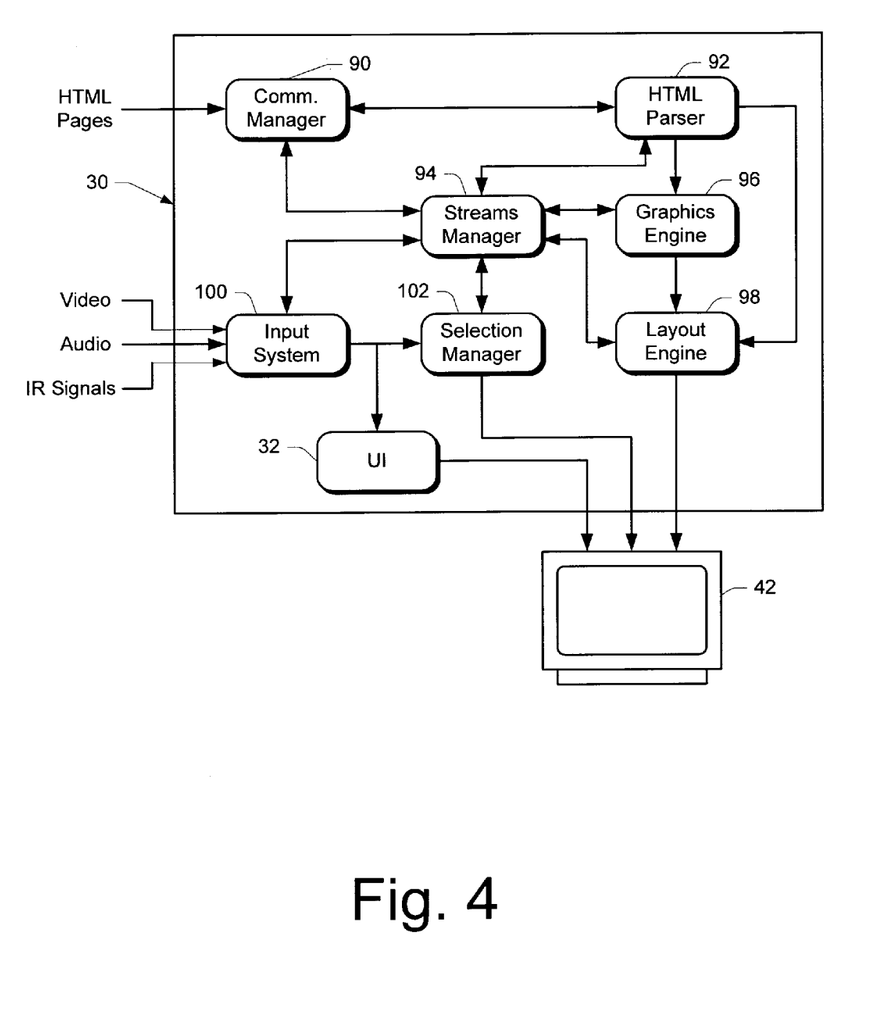
FIG. 4 is a block diagram of the software/hardware architecture of the client.

FIG. 4 shows various components of the client browser software 30 and the functional relationships between the components. The client receives Web pages over the network connection in the form of HTML documents. Each HTML document is initially input to a communications manager 90, which performs functions to receive the HTML document over the network connection including handling high-level communications protocols, such as HTTP (Hypertext Transport Protocol), TCP/IP (Transmission Control Protocol/Internet Protocol), and so forth. The communications manager 90 provides a received HTML document to the HTML parser 92 and a streams manager 94. The HTML parser 92 converts the HTML document descriptions to a displayable format. The streams manager 94 controls and coordinates movement of data throughout the client, including the flow of television video streams to the display 42.

The HTML parser 92 passes images (e.g., JPEG or GIF) provided in the HTML document to a graphics engine 96, which is responsible for measuring and drawing images. The images and text are then passed to a layout engine 98, which arranges them in a prescribed layout for presentation on the display 42.

An input system 100 handles various signal inputs to the set-top box 40, including IR signals received from the remote control 44, audio streams received via the microphone input 78, and video streams received via the video input 80. The IR signals received at the input system 100 are representative of choices made by the user. These choices are passed to a selection handler 102, which identifies the choices and initiates an appropriate response (e.g., loading a new page, bringing up a window, begin/end capture of audio or video, etc.). The input system 100 passes the audio and video streams to the streams manager 94. Upon a decision by the user to capture the audio or video streams, the streams manager 94 stores the desired clip in the storage 34.

The UI 32 is coupled to receive the video received by the input system 100 from the video input. During capture of the video, the UI 32 presents the live video so that the viewer can see what clip is being captured.

Audio/Video Capture UI

Figure 5:
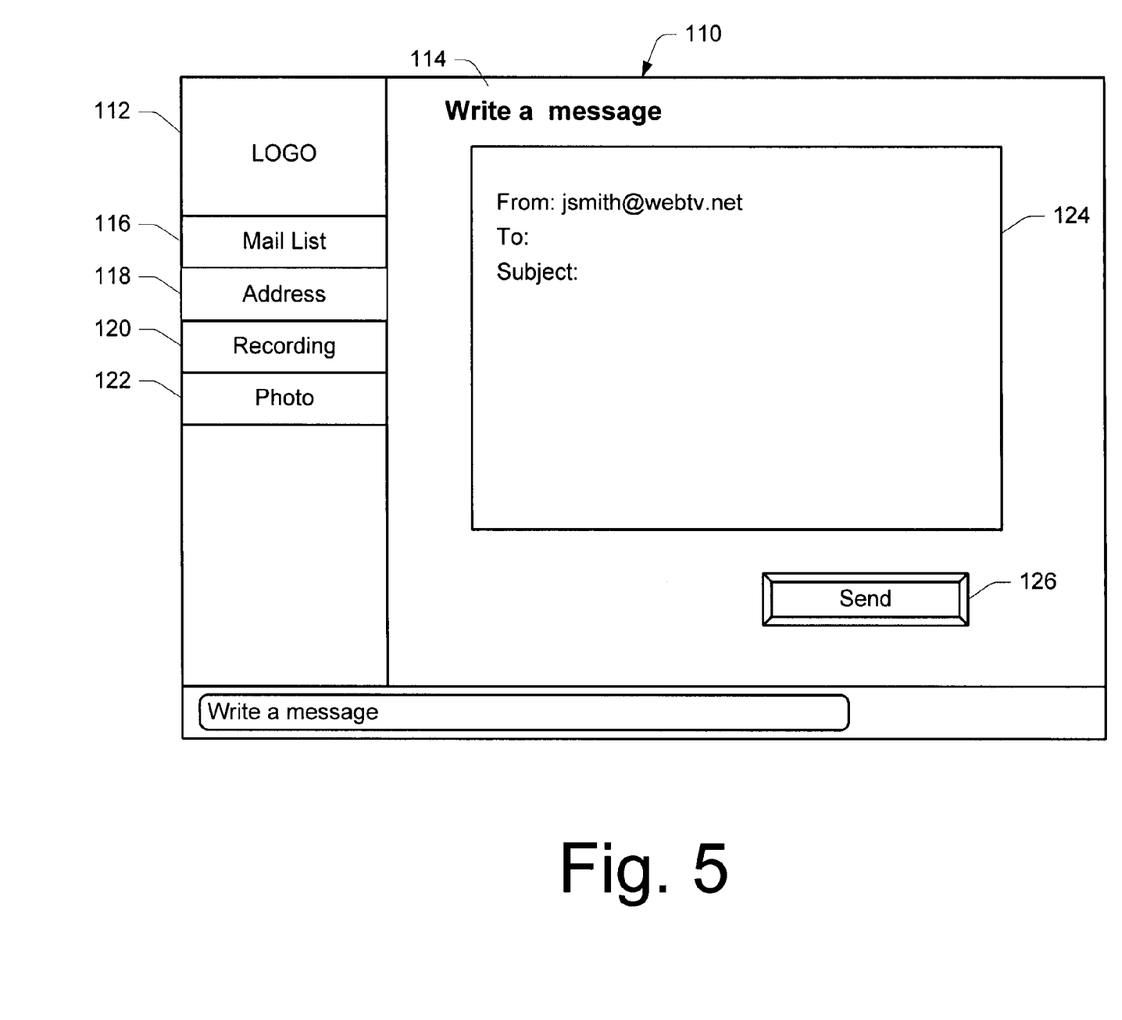
FIG. 5 illustrates an email page rendered by a Web browser.

FIG. 5 shows an email page 110 rendered by the browser UI 32. The email page 110 is accessed and displayed by selecting an appropriate hypertext link on a home page. The email page 110 includes a logo 112, a workspace 114, and multiple links 116-122. The workspace 114 has a text area 124, with "From", "To", and "Subject" lines, and a "Send" button 126. The user can enter a new mail message using this screen.

Link 116 is a hypertext link to a mail list that lists incoming mail messages chronologically. Link 118 is a hypertext link to a list of addresses that the user might wish to select an intended recipient. Links 120 and 122 are used to facilitate audio and video capture for inclusion of an audio or video clip in the email message. Actuation of link 120 brings up an audio capture panel that provides UI functions to enable a user to capture an audio stream input into the microphone. Actuation of link 122 brings up a video capture panel that provides UI functions to enable a user to capture a video stream from the video input or from the television signal.

Figure 6:
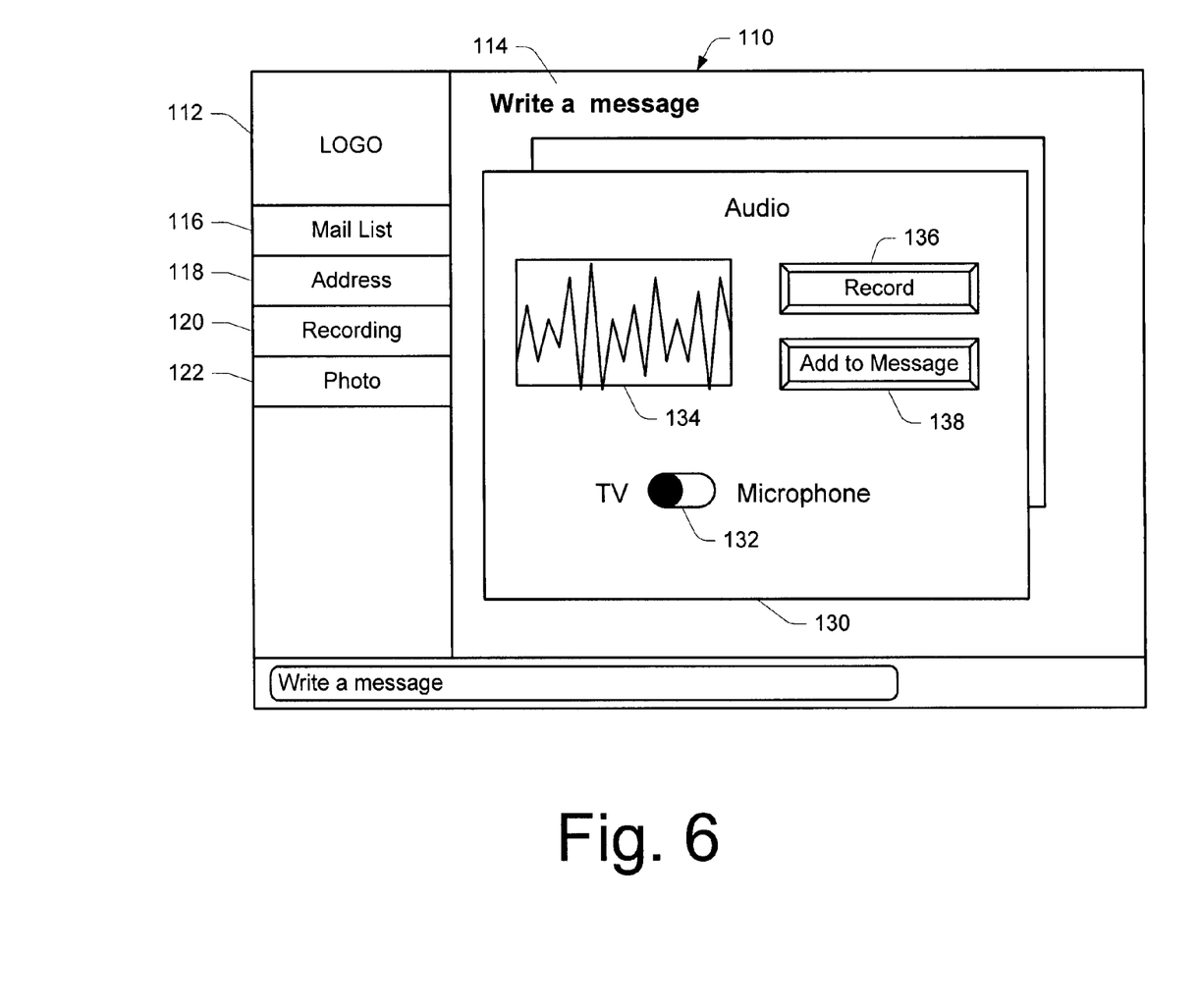
FIG. 6 illustrates an audio capture panel overlaid on the email page of FIG. 5.

FIG. 6 shows the audio capture panel 130 overlaid on the email page 110 in response to activation of "Recording" link 120. The audio capture panel 130 has a switch 132 that allows the user to capture audio signals from either the TV feed or from the microphone input 78. When a valid audio signal is present, an audio waveform (real or picture) appears in box 134. The user can capture an audio clip by pressing a "Record" button 136.

In response to activating the "Record" button 136, the browser records and processes the audio in such a way to significantly reduce the amount of audio data stored at the set-top box for a given duration. The browser receives an audio signal from the TV feed of microphone input 78. The audio signal is sampled at a high sampling rate in stereo. As an example, the signal might be sampled at 44.1 kHz in 16-bit stereo. The browser software initially converts the audio signal from stereo to monophonic and then resamples the signal at a lower sampling rate with appropriate antialias filtering and decimation to maintain audio quality. For example, the audio signal is resampled at 8 kHz mono with 4 bits per sample. Converting to monophonic and decreasing the sampling rate substantially compress the amount of audio data needed to represent the audio signal.

The converted audio signal is then compressed using adaptive differential pulse code modulation (ADPCM) and stored in the standard WAV format. These processes reduce the size and transmission time and allow email recipients to play the sound with a standard audio playback application.

The sound compression is performed in real time so that full high resolution sound need not be stored in the limited memory of the set-top box. By reducing the amount of data to be stored per time segment, longer audio clips can be captured. The technique described above increases the duration of the compressed audio clip by over 40 times as compared to an uncompressed audio clip.

After the user collects a desired sound clip, the user clicks the "Add to Message" button 138 to add the audio clip to the bottom of the mail message. The STB stores the audio clip as a WAV file in the storage 34 in response to activation of the "Add to Message" button 138.

Figure 7:
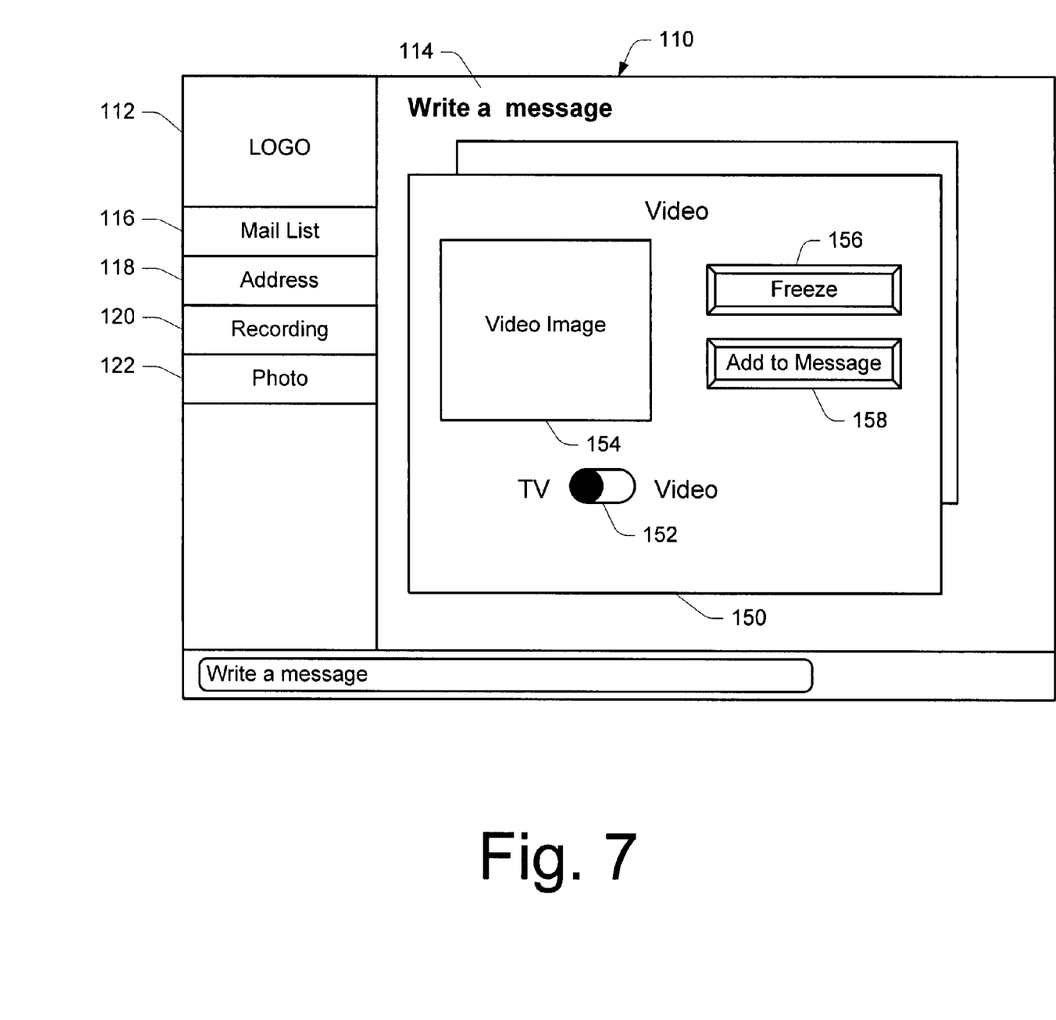
FIG. 7 illustrates a video capture panel overlaid on the email page of FIG. 5.

FIG. 7 shows the video capture panel 150 overlaid on the email page 110 in response to activation of the "Photo" link 122. The video capture panel 150 has a switch 152 that allows the user to capture video streams from either the TV or from the video input 80. When a valid video signal is present, the video stream appears in box 154. The user can capture a video clip by pressing a "Freeze" button 156, which causes a still image to appear in the box 154. Choosing the "Freeze" button 156 again restarts the video stream in the box 154 to enable the user to capture a different clip in the video stream.

In response to activating the "Freeze" button 156, the browser copies an image from the video input buffer. In one implementation, the browser copies one field from each frame (e.g., the odd lines in an interlaced frame), thereby omitting one-half of the data in the video frame. This process eliminates artifacts caused by motion in the video and reduces the amount of data to be stored for a given image.

The set-top box then resizes the image to a smaller size appropriate for display as part of an email UI. The resizing uses anti-aliased scaling to maintain a high quality image. After it is resized, it is compressed with JPEG compression, a standard compression format for photographs. These two steps significantly decrease the size of the data that needs to be transmitted, and easily allow the email recipients to display the photograph.

In the case of a video clip involving multiple frames (as opposed to a single still image frame), the set-top box performs essentially the same steps above, but initially captures a reduced number of frames from the streaming video. For example, if the video input is at 60 frames/sec, the set-top box might capture one-fourth of the frames, or 15 frames/sec, to reduce the amount of data to be included in the email message. After resizing, the reduced-size video clip is compressed using MPEG, a standard compression format for video.

The user then adds the video clip to the email message by clicking the "Add to Message" button 158. The STB stores the video clip locally in the storage 34 in response to activation of the "Add to Message" button 158.

Figure 8:
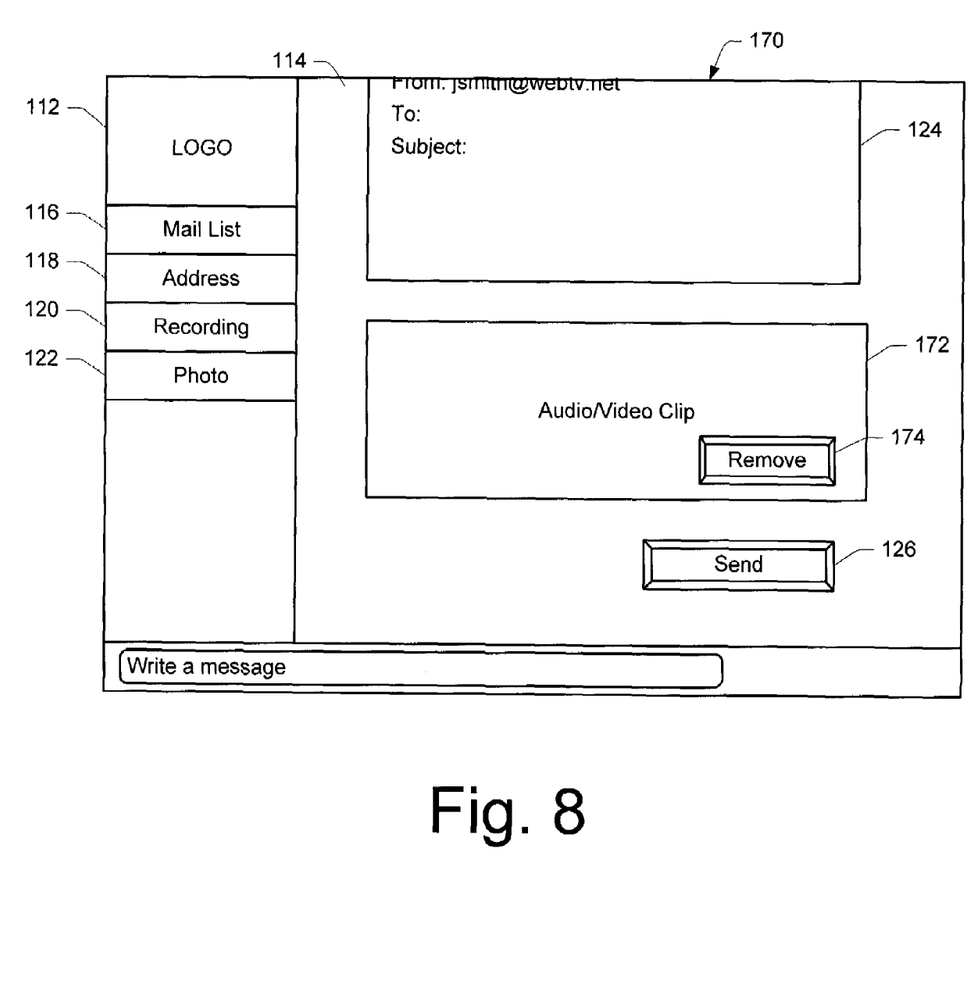
FIG. 8 illustrates the email page of FIG. 5, but with a video or audio clip attached.

FIG. 8 shows a new email page 170 with the audio/video clip 172 attached to the bottom of the email message. The email page 170 has a "Remove" button 174 that allows the user the option of removing the audio/video clip 172.

Audio/Video Capture Operation

Figure 9:
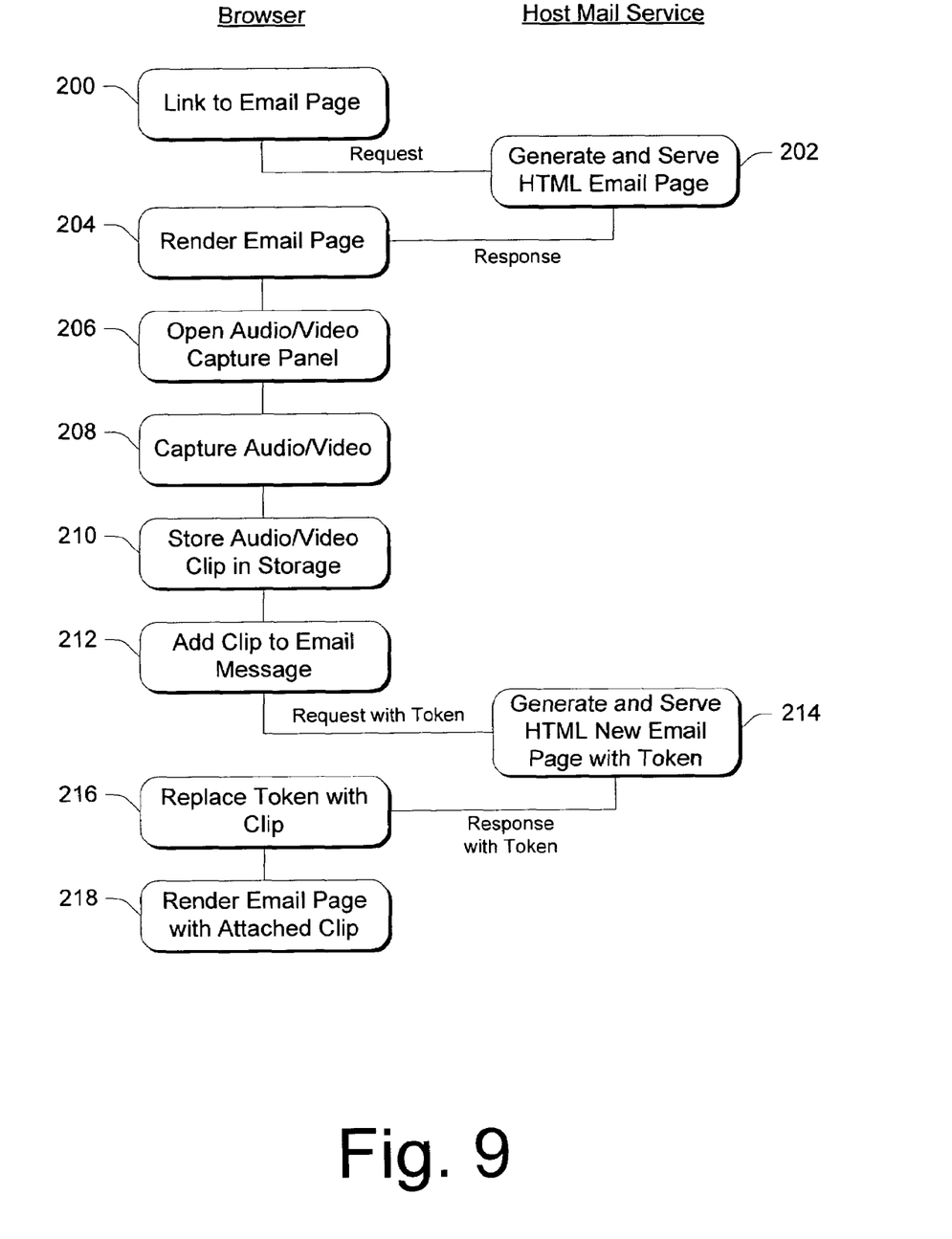
FIGS. 9 and 10 are a flowchart illustrating steps in a method for capturing audio and video clips within an email message.
Figure 10:
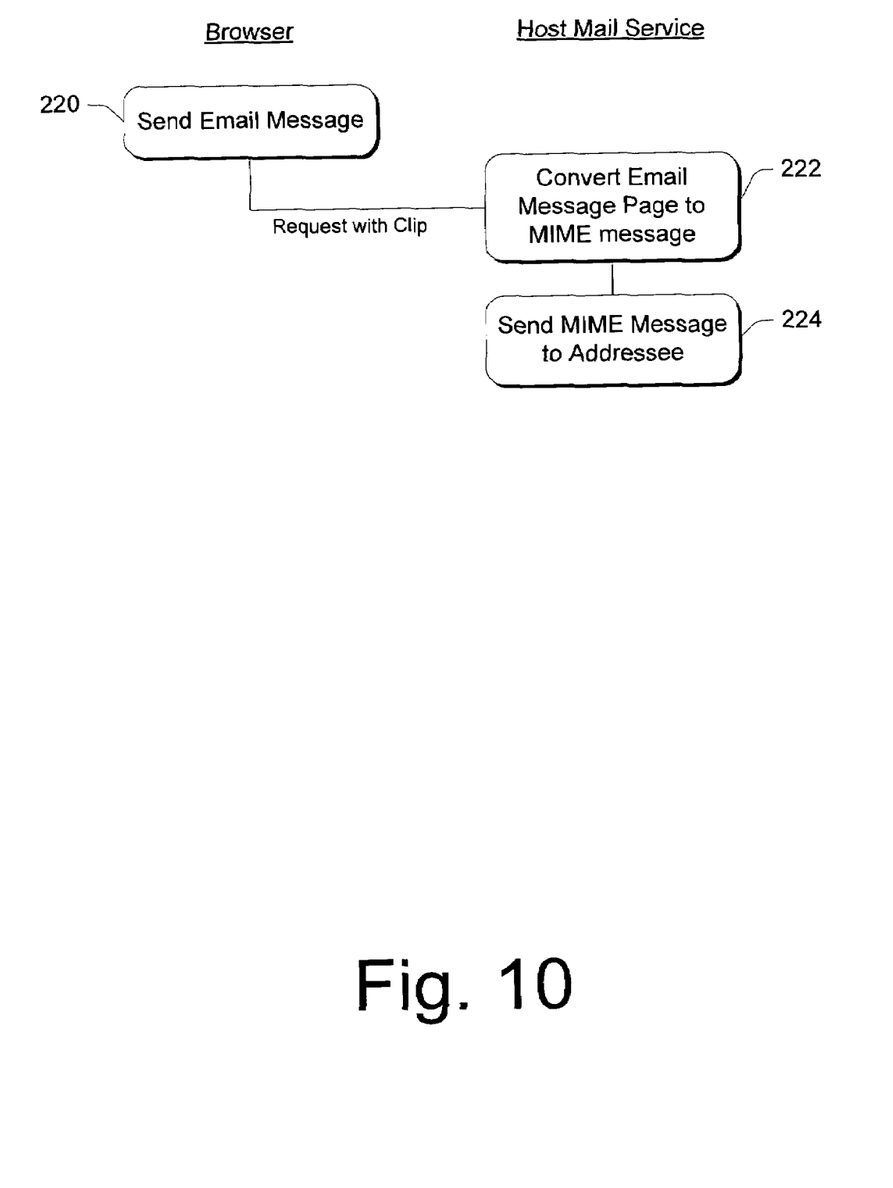

FIGS. 9 and 10 show steps in a method for capturing audio or video signals for inclusion in an email message. The steps are performed by computer-executable instructions stored in memory at the set-top box and the host mail service. Alternatively, the steps might be performed by specific hardware components that contain hardwired logic for performing the steps, or by any combination of programmed computer components and custom hardware components.

At step 200, the user activates the link to the email page 110. In response, the browser sends a request over to the host email service 36, which generates and serves the email page 110 (step 202). The page is written in markup language, such as HTML. The browser renders the email page 110 as illustrated in FIG. 5 (step 204). At this point, the user can optionally enter text to write an email message.

At step 206, the user activates either the "Recording" link 120 or the "Photo" link 122. Activation of link 120 causes the audio capture panel 130 to appear over the email page 110, as shown in FIG. 6. Activation of link 122 causes the video capture panel 150 to appear over the email page 110, as shown in FIG. 7.

At step 208, the user employs the capture panels 130 or 150 to capture an audio or video clip. The user clicks the "Record" or "Freeze" buttons in the respective panels to record the audio or video clip. These clips are stored in storage 34 (step 210).

After the user has captured the desired audio or video clip, the user adds the clip to the email message by clicking the "Add to Message" button 138 or 158 in the capture panels (step 212). Activation of the button causes the browser to send a request for new HTML email page that shows both the message and the attached clip. However, rather than sending across the entire video or audio clip, the browser simply inserts a token that is representative of the attached clip. The token may include such information as the name of the audio or video file, the size of the video image, and so forth. This results in a substantial savings in transmission time as the large size audio or video files are not needlessly transferred over to the host mail server merely to be transferred back again with the next page.

At step 214, the host mail service generates a response specifying a new HTML page containing the email message. The response also includes the token and indicates a location in the new page at which the audio or video data is to be rendered. The host mail service returns the response to the client.

At step 216, the browser extracts the token and retrieves the audio or video file referenced by the token from the storage 34. The browser inserts the image or sound bite at the indicated location in the HTML email page. The browser then renders the HTML email page with the image or sound bite shown attached to the bottom (step 218).

Although the addition of an audio or video clip involves a round trip request/response cycle with the host mail service, this process is hidden to the user. That is, to the user, the UI experience simply involves capturing the audio/video clip and hitting the "Add to Message" button. A new screen appears rapidly with the clip attached to the bottom of the message.

When the message is complete, the user clicks the "Send" link 126 in the email screen (step 220 in FIG. 10). In response, the browser sends the text and audio/video file over to the host mail service using a conventional POST command of HTTP. The host mail service converts the text and audio/video files to a MIME message (step 222 in FIG. 10), and forwards the MIME message to the intended recipient (step 224 in FIG. 10). The intended recipient can then render the MIME message using a browser to read and see or listen to the attached clip.

Although embodiments of Browser-Based Email System with User Interface for Audio/Video Capture have been described in language specific to structural features and/or methods, it is to be understood that the subject of the appended claims is not necessarily limited to the specific features or methods described. Rather, the specific features and methods are disclosed as exemplary implementations of Browser-Based Email System with User Interface for Audio/Video Capture.

The invention claimed is:

1. One or more computer readable media comprising computer executable instructions that, when executed, direct a browser-based email system to capture audio data for inclusion in an email message by a method comprising:

presenting a first user interface for entering an email message, the first user interface including a selectable control to initiate a second user interface from which the audio data is included in the email message;

presenting the second user interface having at least a first control that enables recordation of the audio data and at least a second control that enables inclusion of the audio data in the email message;

activating the first control to record the audio data;

storing the audio data in a storage;

upon actuation of the second control in the second user interface, submitting a first request to a host mail server for an email page that contains the email message with a token that represents the audio data included therein, wherein the first request contains the token in lieu of the audio data;

sending the email page, by the host mail server, to a browser, wherein the email page includes the token and indicates a location at which the audio data is to be rendered;

extracting, by the browser, the token and retrieving the audio data referenced by the token from the storage;

inserting, by the browser, the audio data into the indicated location in the email page;

rendering the email page for user interaction; and upon actuation of an email page control of the email page, submitting a second request to the host mail server to send the email message with the inserted audio data included to a recipient of the email message.

2. One or more computer readable media comprising computer executable instructions that, when executed, direct a browser-based email system to capture video data for inclusion in an email message for delivery to a television set-top box by a method comprising:

presenting a first user interface for entering an email message, the first user interface including a selectable control to initiate a second user interface from which the video data is included in the email message;

presenting the second user interface having at least a first control that enables recordation of the video data and at least a second control that enables inclusion of the video data in the email message;

activating the first control to record the video data;

storing the video data in a storage;

upon actuation of the second control in the second user interface, submitting a first request to a host mail server for an email page that contains the email message with a token that represents the video data included therein, wherein the first request contains the token in lieu of the video data;

sending the email page, by the host mail server, to a browser, wherein the email page includes the token and indicates a location at which the video data is to be rendered;

extracting, by the browser, the token and retrieving the video data referenced by the token from the storage;

inserting, by the browser, the video data into the indicated location in the email page;

rendering the email page for user interaction; and upon actuation of an email page control of the email page, submitting a second request to the host mail server to send the email message with the inserted video data to the television set-top box.

3. One or more computer readable media comprising computer executable instructions that, when executed, direct a browser-based email system to capture a still image for inclusion in an email message by a method comprising:

presenting a first user interface for entering an email message, the first user interface including a selectable control to initiate a second user interface from which the still image is included in the email message;

presenting the second user interface having at least a first control that enables recordation of the still image and at least a second control that enables inclusion of the still image in the email message;

activating the first control to record the still image;

storing the still image in a storage;

upon actuation of the second control in the second user interface, submitting a first request to a host mail server for an email page that contains the email message with a token that represents the still image included therein, wherein the first request contains the token in lieu of the still image;

sending the email page, by the host mail server, to a browser, wherein the email page includes the token and indicates a location at which the still image is to be rendered;

extracting, by the browser, the token and retrieving the still image referenced by the token from the storage;

inserting, by the browser, the still image into the indicated location in the email page;

rendering the email page for user interaction; and upon actuation of an email page control of the email page, submitting a second request to the host mail server to send the email message with the inserted still image included to a recipient of the email message.

* * * * *